United States Patent
Yang et al.

(10) Patent No.: US 12,079,936 B2
(45) Date of Patent: Sep. 3, 2024

(54) PORTRAIT EDITING AND SYNTHESIS

(71) Applicant: Microsoft Technology Licensing, LLC, Redmond, WA (US)

(72) Inventors: Jiaolong Yang, Redmond, WA (US); Fang Wen, Beijing (CN); Dong Chen, Zhuji (CN); Xin Tong, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/615,084

(22) PCT Filed: Jun. 8, 2020

(86) PCT No.: PCT/US2020/036543
§ 371 (c)(1),
(2) Date: Nov. 29, 2021

(87) PCT Pub. No.: WO2020/263541
PCT Pub. Date: Dec. 30, 2020

(65) Prior Publication Data
US 2022/0222897 A1   Jul. 14, 2022

(30) Foreign Application Priority Data

Jun. 28, 2019  (CN) .......................... 201910578770.7

(51) Int. Cl.
*G06T 19/00* (2011.01)
*G06T 7/11* (2017.01)
(Continued)

(52) U.S. Cl.
CPC ............. *G06T 19/00* (2013.01); *G06T 7/11* (2017.01); *G06T 7/50* (2017.01); *G06T 11/00* (2013.01);
(Continued)

(58) Field of Classification Search
None
See application file for complete search history.

(56) References Cited

U.S. PATENT DOCUMENTS 7,835,568 B2 * 11/2010 Park .................. G06T 17/10
                                          382/181
8,306,238 B2  11/2012 Siotis
(Continued)

FOREIGN PATENT DOCUMENTS

| CN | 104346824 A | 2/2015 |
| CN | 107924579 A | 4/2018 |

(Continued)

OTHER PUBLICATIONS

Bao, et al., "Towards Open-Set Identity Preserving Face Synthesis", In Proceedings of the IEEE Conference on Computer Vision and Pattern Recognition, Jun. 18, 2018, pp. 6713-6722.
(Continued)

*Primary Examiner* — Saptarshi Mazumder
(74) *Attorney, Agent, or Firm* — Schwegman Lundberg & Woessner, P.A.

(57) ABSTRACT

In accordance with implementations of the present disclosure, there is provided a solution for portrait editing and synthesis. In this solution, a first image about a head of a user is obtained. A three-dimensional head model representing the head of the user is generated based on the first image. In response to receiving a command of changing a head feature of the user, the three-dimensional head model is transformed to reflect the changed head feature. A second image about the head of the user is generated based on the transformed three-dimensional head model, and reflects the changed head feature of the user. In this way, the solution can realize editing of features like a head pose and/or a facial expression
(Continued)

based on a single portrait image without manual intervention and automatically synthesize a corresponding image.

10 Claims, 6 Drawing Sheets

(51) Int. Cl.
  *G06T 7/50* (2017.01)
  *G06T 11/00* (2006.01)
  *G06T 17/00* (2006.01)
  *G06V 40/16* (2022.01)

(52) U.S. Cl.
  CPC .............. *G06T 17/00* (2013.01); *G06V 40/16* (2022.01); *G06T 2200/08* (2013.01); *G06T 2207/20021* (2013.01); *G06T 2207/20081* (2013.01); *G06T 2207/20084* (2013.01); *G06T 2207/20212* (2013.01); *G06T 2207/30201* (2013.01)

(56) References Cited

U.S. PATENT DOCUMENTS

| | | | |
|---|---|---|---|
| 8,306,283 B2* | 11/2012 | Zhang | H04N 5/262 382/173 |
| 9,449,432 B2 | 9/2016 | Kanaujia et al. | |
| 10,482,565 B1* | 11/2019 | Chen | G06T 11/001 |
| 10,796,480 B2* | 10/2020 | Chen | G06V 40/166 |
| 2012/0306874 A1 | 12/2012 | Nguyen et al. | |
| 2014/0043329 A1* | 2/2014 | Wang | G06V 40/168 345/420 |
| 2018/0096503 A1* | 4/2018 | Kaehler | G06V 40/197 |
| 2019/0035113 A1* | 1/2019 | Salvi | G06N 3/084 |
| 2019/0035149 A1 | 1/2019 | Chen et al. | |

FOREIGN PATENT DOCUMENTS

| | | |
|---|---|---|
| CN | 104966316 A | 3/2019 |
| CN | 108573527 B | 2/2020 |
| CN | 107392984 A | 9/2020 |

OTHER PUBLICATIONS

Blanz, et al., "A Morphable Model For The Synthesis of 3D Faces", In Proceedings of the 26th Annual Conference on Computer Graphics and Interactive Techniques, Jul. 1, 1999, pp. 187-194.
Bleyer, et al., "PatchMatch Stereo—Stereo Matching with Slanted Support Windows", In Proceedings of the British Machine Vision Conference, Aug. 29, 2011, 11 Pages.
Brox, et al., "High Accuracy Optical Flow Estimation Based on a Theory for Warping", In Proceedings of the 8th European Conference on Computer Vision, vol. 4, May 11, 2004, pp. 25-36.
Cao, et al., "FaceWarehouse: A 3D Facial Expression Database for Visual Computing", In Journal of the IEEE Transactions on Visualization and Computer Graphics, vol. 20, Issue, 3, Nov. 4, 2013, pp. 413-425.
Chai, et al., "AutoHair: Fully Automatic Hair Modeling from a Single Image", In Proceedings of ACM Transactions on Graphics, vol. 35, Issue 4, Jul. 24, 2016, 12 Pages.
Chai, et al., "Dynamic Hair Manipulation in Images and Videos", In Journal of the ACM Transactions on Graphics, vol. 32, Issue 4, Jul. 21, 2013, 8 Pages.
Chai, et al., "High-Quality Hair Modeling from a Single Portrait Photo", In Journal of the ACM Transactions on Graphics, vol. 34, Issue 6, Nov. 2, 2015, 10 Pages.
Chang, et al., "PairedCycleGAN: Asymmetric Style Transfer for Applying and Removing Makeup", In Proceedings of the IEEE/CVF Conference on Computer Vision and Pattern Recognition, Jun. 23, 2018, pp. 40-48.
Choi, et al., "StarGAN: Unified Generative Adversarial Networks for Multi-Domain Image-to-Image Translation", In Proceedings of the IEEE/CVF Conference on Computer Vision and Pattern Recognition, Jun. 18, 2018, pp. 8789-8797.
Chopra, et al., "Learning a Similarity Metric Discriminatively, with Application to Face Verification", In Proceedings of the IEEE Computer Society Conference on Computer Vision and Pattern Recognition, Jun. 20, 2005, 8 Pages.
Dekel, et al., "Sparse, Smart Contours to Represent and Edit Images", In Proceedings of the IEEE Conference on Computer Vision and Pattern Recognition, Jun. 18, 2018, pp. 3511-3520.
Fried, et al., "Perspective-Aware Manipulation of Portrait Photos", In Journal of ACM Transactions on Graphics, vol. 35, Issue 4, Jul. 24, 2016, 10 Pages.
Geng, et al., "Warp-guided GANs for Single-Photo Facial Animation", In Journal of the ACM Transactions on Graphics, vol. 37, Issue 6, Dec. 4, 2018, 12 Pages.
Genova, et al., "Unsupervised Training for 3D Morphable Model Regression", In Proceedings of the IEEE Conference on Computer Vision and Pattern Recognition, Jun. 18, 2018, pp. 8377-8386.
Godard, et al., "Unsupervised Monocular Depth Estimation with Left-Right Consistency", In Proceedings of IEEE Conference on Computer Vision and Pattern Recognition, Jul. 21, 2017, pp. 6602-6611.
Goodfellow, et al., "Generative Adversarial Nets", In Proceedings of the 27th International Conference on Neural Information Processing Systems, Dec. 8, 2014, 9 Pages.
Gross, et al., "Multi-Pie", In Journal of the Image and Vision Computing, vol. 28, Issue 5, May 1, 2010, 21 Pages.
Guo, et al., "CNN-Based Real-Time Dense Face Reconstruction with Inverse-Rendered Photo-Realistic Face Images", In Proceedings of the IEEE Transactions on Pattern Analysis and Machine Intelligence, vol. 41, Issue 6, Jun. 2018, 14 Pages.
Hadar, et al., "Bringing Portraits to Life", In Proceedings of ACM Transactions on Graphics, vol. 36, Issue 6, Nov. 20, 2017, 13 Pages.
Hassner et al., "Effective Face Frontalization in Unconstrained Images", In Proceedings of Conference on Computer Vision and Pattern Recognition, Jun. 7, 2015, pp. 4295-4304.
He, et al., "Deep Residual Learning for Image Recognition", In Proceedings of the IEEE Conference on Computer Vision and Pattern Recognition, Jun. 27, 2016, pp. 770-778.
Huang, et al., "Beyond Face Rotation: Global and Local Perception GAN for Photorealistic and Identity Preserving Frontal View Synthesis", In Proceedings of IEEE International Conference on Computer Vision, Oct. 22, 2017, pp. 2458-2467.
Huang, et al., "Labeled Faces in the Wild: A Database for Studying Face Recognition in Unconstrained Environments", In Technical Report 07-49, University of Massachusetts, Amherst, Oct. 2007, 11 Pages.
Hwang, et al., "3D Face Modeling Using the Multi-Deformable Method", In Journal of Sensors (Basel), vol. 12, Issue 10, Oct. 2012, pp. 12870-12889.
Jiang, et al., "3D Face Reconstruction with Geometry Details from a Single Image", In Proceedings of IEEE Transactions on Image Processing, vol. 27, Issue 10, Jun. 11, 2018, 14 Pages.
Kim, et al., "Deep Video Portraits", In Journal of the ACM Transactions on Graphics, vol. 37, Issue 4, Jul. 30, 2018, 14 Pages.
Kingma, et al., "Adam: A Method for Stochastic Optimization", In Proceedings of 3rd International Conference on Learning Representations, May 7, 2015, 15 Pages.
Li, et al., "BeautyGAN: Instance-level Facial Makeup Transfer with Deep Generative Adversarial Network", In Proceedings of the 26th ACM International Conference on Multimedia, Oct. 15, 2018, pp. 645-653.
Li, et al., "Dense Intrinsic Appearance Flow for Human Pose Transfer", Retrieved from: https://arxiv.org/abs/1903.11326, Mar. 27, 2019, 17 Pages.
Liang, et al., "Video to Fully Automatic 3D Hair Model", In Proceedings of ACM Transactions on Graphics, vol. 37, Issue 6, Nov. 2018, 14 Pages.
Lin, et al., "Face Parsing With RoI Tanh-Warping", In Proceedings of the IEEE/CVF Conference on Computer Vision and Pattern Recognition, Jun. 15, 2019, pp. 5647-5656.

(56) References Cited

OTHER PUBLICATIONS

Liu, et al., "Deep Learning Face Attributes in the Wild", In Proceedings of International Conference on Computer Vision, Dec. 7, 2015, pp. 3730-3738.

Liu, et al., "Geometry-Aware Deep Network for Single-Image Novel View Synthesis", In Proceeding of the IEEE/CVF Conference on Computer Vision and Pattern Recognition, Jun. 18, 2018, 9 Pages.

Mao, et al., "Least Squares Generative Adversarial Networks", In Proceedings of the IEEE International Conference on Computer Vision, Oct. 22, 2017, pp. 2813-2821.

Nazeri, et al., "EdgeConnect: Generative Image Inpainting with Adversarial Edge Learning", https://arxiv.org/pdf/1901.00212.pdf, Jan. 11, 2019, 17 Pages.

Paysan, et al., "A 3D Face Model for Pose and Illumination Invariant Face Recognition", In Proceedings of the Sixth IEEE International Conference on Advanced Video and Signal Based Surveillance, Sep. 2, 2009, pp. 296-301.

"International Search Report and Written Opinion Issued in PCT Application No. PCT/US2020/036543", dated Oct. 23, 2020, 18 Pages.

Zhu, et al., "Face Alignment Across Large Poses: A 3D Solution", In Proceedings of IEEE Conference on Computer Vision and Pattern Recognition, Jun. 27, 2016, pp. 146-155.

Zhou, et al., "Unsupervised Learning of Depth and Ego-Motion from Video", In Proceeding of IEEE Conference on Computer Vision and Pattern Recognition, Jul. 21, 2017, pp. 1851-1860.

Portenier, et al., "Faceshop: Deep Sketch-Based Face Image Editing", In Proceedings of ACM Transactions on Graphics, vol. 37, Issue 4, Jul. 30, 2018, 13 Pages.

Pumarola, et al., "GANimation: Anatomically-aware Facial Animation from a Single Image", In Proceedings of the European Conference on Computer Vision, Sep. 8, 2018, 16 Pages.

Shu, et al., "Neural Face Editing with Intrinsic Image Disentangling", In Proceedings of the IEEE Conference on Computer Vision and Pattern Recognition, Jul. 21, 2017, pp. 5444-5453.

Song, Lingxiao, "Geometry Guided Adversarial Facial Expression Synthesis", In Proceedings of ACM International Conference on Multimedia, Oct. 22, 2018, pp. 627-635.

Taigman, et al., "DeepFace: Closing the Gap to Human-Level Performance in Face Verification", In Proceedings of the IEEE Conference on Computer Vision and Pattern Recognition, Jun. 23, 2014, 8 Pages.

Tewari, et al., "MoFA: Model-Based Deep Convolutional Face Autoencoder for Unsupervised Monocular Reconstruction", In Proceedings of the IEEE International Conference on Computer Vision, Oct. 22, 2017, pp. 3735-3744.

Thies, et al., "Face2Face: Real-Time Face Capture and Reenactment of RGB Videos", In Proceedings of the IEEE Conference on Computer Vision and Pattern Recognition, Jun. 27, 2016, pp. 2387-2395.

Thies, et al., "Headon: Real-Time Reenactment of Human Portrait Videos", In Journal of ACM Transactions on Graphics, vol. 37, Issue 4, Jul. 30, 2018, 13 Pages.

Tran, et al., "On Learning 3D Face Morphable Model from In-the-Wild Images", Retrieved from: https://arxiv.org/pdf/1808.09560v1.pdf, Aug. 28, 2018, 14 Pages.

Tran, et al., "Regressing Robust and Discriminative 3D Morphable Models with a very Deep Neural Network", In Proceedings of the IEEE Conference on Computer Vision and Pattern Recognition, Jul. 21, 2017, pp. 1493-1502.

Zhu, et al., "High-Fidelity Pose and Expression Normalization for Face Recognition in the Wild", In Proceedings of IEEE Conference on Computer Vision and Pattern Recognition, Jun. 7, 2015, pp. 787-796.

Wang, et al., "Face Aging with Identity-Preserved Conditional Generative Adversarial Networks", In Proceedings of IEEE/CVF Conference on Computer Vision and Pattern Recognition, Jun. 18, 2018, pp. 7939-7947.

Wang, et al., "High-Resolution Image Synthesis and Semantic Manipulation With Conditional GANs", In Proceedings of the IEEE Conference on Computer Vision and Pattern Recognition, Jun. 18, 2018, pp. 8798-8807.

Xu, et al., "Deep 3D Portrait from a Single Image", In Proceedings of IEEE/CVF Conference on Computer Vision and Pattern Recognition, Jun. 13, 2020, pp. 7707-7717.

Yang, et al., "Dense, Accurate Optical Flow Estimation with Piecewise Parametric Model", In Proceedings of IEEE Conference on Computer Vision and Pattern Recognition, Jun. 7, 2015, pp. 1019-1027.

Yin, et al., "Towards Large-Pose Face Frontalization in the Wild", In Proceedings of IEEE International Conference on Computer Vision, Oct. 22, 2017, pp. 4010-4019.

Yu, Jiahui, "Generative Image Inpainting with Contextual Attention", In Proceedings of IEEE/CVF Conference On Computer Vision and Pattern Recognition, Jan. 24, 2018, pp. 5505-5514.

Zhang, et al., "Age Progression/Regression by Conditional Adversarial Autoencoder", In Proceedings of IEEE Conference on Computer Vision and Pattern Recognition, Jul. 21, 2017, pp. 4352-4360.

Zhou, et al., "HairNet: Single-View Hair Reconstruction using Convolutional Neural Networks", In Proceedings of 15th European Conference on Computer Vision, Sep. 8, 2018, 17 Pages.

"An End-to-End Open Source Machine Learning Platform", Retrieved from: https://web.archive.org/web/20220106133606/https://www.tensorflow.org/, Jan. 6, 2022, 9 Pages.

Office Action Received for Chinese Application No. 201910578770.7, mailed on May 31, 2024, 22 pages (English Translation Provided).

\* cited by examiner

PORTRAIT EDITING AND SYNTHESIS

CROSS-REFERENCE TO RELATED APPLICATION

This application is a U.S. National Stage Filing under 35 U.S.C. 371 of International Patent Application Serial No. PCT/US2020/036543, filed Jun. 8, 2020, and published as WO 2020/263541 A1 on Dec. 30, 2020, which claims priority to Chinese Application No. 201910578770.7, filed Jun. 28, 2019, which applications and publication are incorporated herein by reference in their entirety.

BACKGROUND

Face image (also known as "portrait") editing and synthesis have seen remarkable progress with the enormous growth of neural network technologies, such as development of Convolutional Neural Networks (CNNs) and particularly Generative Adversarial Nets (GANs). As used herein, portrait editing and synthesis refer to changing some features of a portrait and synthesizing a new portrait to reflect the changed features. The portrait editing and synthesis technique has broad applications in many fields like image processing, social networking and animation synthesis. Notwithstanding the remarkable progress, most traditional solutions can only edit some appearance attributes of the portrait to a modest degree, such as changing skin and/or hair color or other appearance attributes. Few solutions can edit the head pose of the portrait and synthesize the image, which is a challenging task necessitating a substantial image content regeneration in the whole head region and beyond.

SUMMARY

In accordance with implementations of the present disclosure, there is provided a solution for portrait editing and synthesis. In this solution, a first image about a head of a user is obtained. A three-dimensional head model representing the head of the user is generated based on the first image. In response to receiving a command of changing a head feature of the user, the three-dimensional head model is transformed to reflect the changed head feature. A second image about the head of the user is generated based on the transformed three-dimensional head model, and reflects the changed head feature of the user. In this way, the solution can realize editing of features like a head pose and/or a facial expression based on a single portrait image without manual intervention and automatically synthesize a corresponding image.

This Summary is provided to introduce a selection of concepts in a simplified form that are further described below in the Detailed Description. This Summary is not intended to identify key features or essential features of the subject matter, nor is it intended to be used to limit the scope of the subject matter.

BRIEF DESCRIPTION OF THE DRAWINGS

In these drawings, same or similar reference signs indicate same or similar elements.

DETAILED DESCRIPTION

The present disclosure will now be discussed with reference to several example implementations. It is to be understood these implementations are discussed only for the purpose of enabling those skilled persons in the art to better understand and thus implement the present disclosure, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As used herein, a "neural network" can process an input and provide a corresponding output and usually includes an input layer, an output layer and one or more hidden layers between the input layer and the output layer. The neural network for use in deep learning applications usually includes many hidden layers to extend the depth of the network. Respective layers of the neural network are connected in sequence with output of a previous layer being provided as an input for a next layer, where the input layer receives the input of the neural network and an output of the output layer acts as the final output of the neural network. Each layer of the neural network includes one or nodes (also referred to as processing nodes or neurons) and each node processes the input from the previous layer. As one type of the neural network, CNN includes one or more convolutional layers for executing convolutional operations on their respective inputs. CNN can be applied to various scenarios and is particularly suitable for processing images or video data. In the text, the terms "neural network," "network" and "neural network model" can be used interchangeably.

As described above, portrait editing and synthesis have seen remarkable progress with the enormous growth of CNN (GAN in particular). Portrait editing and synthesis here refers to changing some features of a portrait and synthesizing a new portrait to embody the changed features. As used herein, portrait editing and synthesis refer to changing some features of a portrait and synthesizing a new portrait to reflect the changed features. The portrait editing and synthesis technique has broad applications in the fields like image processing, social networking and animation synthesis. Notwithstanding the remarkable progress, most traditional solutions can only edit some appearance attributes of the portrait to a modest degree, such as changing skin and/or hair color or other appearance attributes. Few solutions can edit the head pose of the portrait and synthesize the image, which is a challenging task necessitating a substantial image content regeneration in the whole head region and beyond.

Some problems existing in the traditional portrait editing and synthesis solutions have been discussed above. In accordance with implementations of the present disclosure, there is provided a solution for portrait editing and synthesis with the purpose of solving one or more of the above problems and other potential problems. In this solution, a three-dimensional (3D) head model is reconstructed based on a single image of a user's head, such that a head pose, a facial expression and/or other head features of the user can be changed by manipulating the 3D head model. Then, a new image about the user's head is synthesized by re-projecting the transformed 3D head model onto a two-dimensional (2D) plane to reflect the changed head features. Various example implementations of the solution are further described in details below with reference to the drawings.

Figure 1:
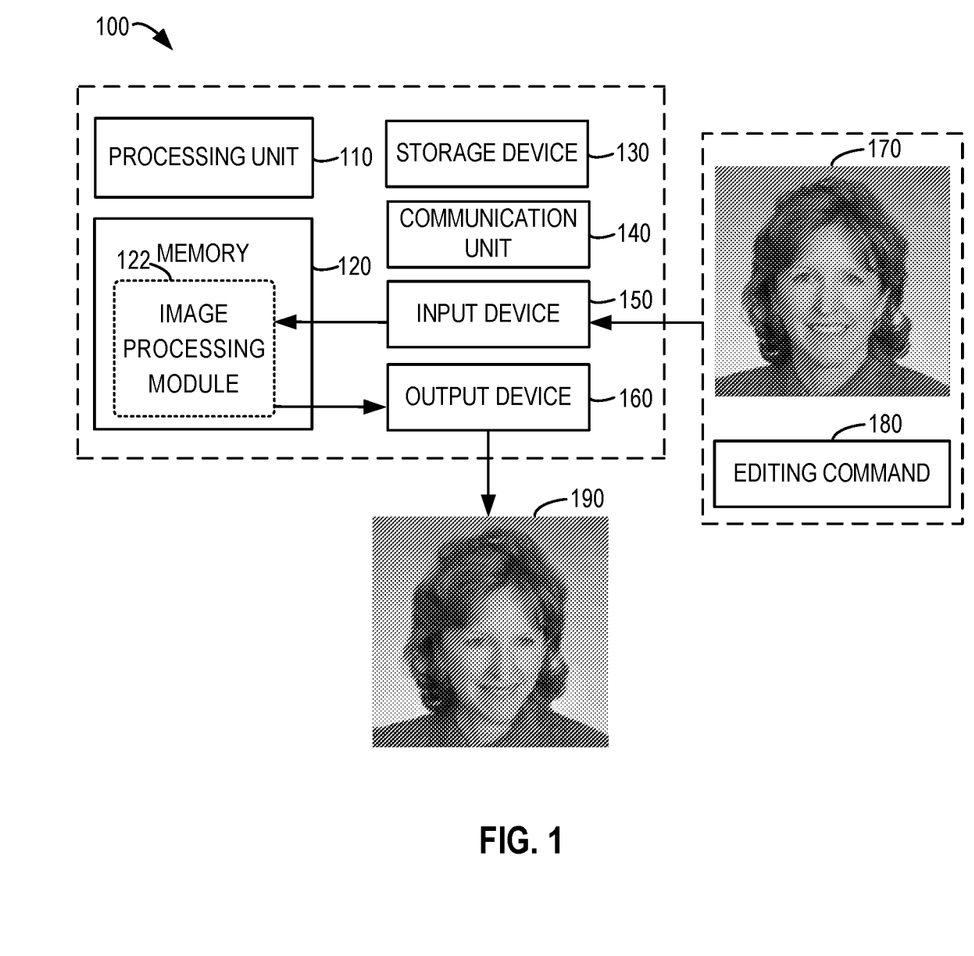
FIG. 1 illustrates a block diagram of a computing device capable of performing a plurality of implementations of the present disclosure.

FIG. 1 illustrates a block diagram of a computing device 100 that can carry out a plurality of implementations of the present disclosure. It should be understood that the computing device 100 shown in FIG. 1 is only exemplary, without suggesting any limitation to functions and the scope of the implementations of the present disclosure. According to FIG. 1, the computing device 100 includes a computing device 100 in the form of a general purpose computing device. Components of the computing device 100 can include, but not limited to, one or more processors or processing units 110, memory 120, storage device 130, one or more communication units 140, one or more input devices 150 and one or more output devices 160.

In some implementations, the computing device 100 can be implemented as various user terminals or service terminals with computing power. The service terminals can be servers, large-scale computing devices and the like provided by a variety of service providers. The user terminal, for example, is mobile terminal, fixed terminal or portable terminal of any types, including mobile phone, site, unit, device, multimedia computer, multimedia tablet, Internet nodes, communicator, desktop computer, laptop computer, notebook computer, netbook computer, tablet computer, Personal Communication System (PCS) device, personal navigation device, Personal Digital Assistant (PDA), audio/video player, digital camera/video, positioning device, television receiver, radio broadcast receiver, electronic book device, gaming device or any other combinations thereof consisting of accessories and peripherals of these devices or any other combinations thereof. It can also be predicted that the computing device 100 can support any types of user-specific interfaces (such as "wearable" circuit and the like).

The processing unit 110 can be a physical or virtual processor and can execute various processing based on the programs stored in the memory 120. In a multi-processor system, a plurality of processing units executes computer-executable instructions in parallel to enhance parallel processing capability of the computing device 100. The processing unit 110 also can be known as central processing unit (CPU), microprocessor, controller and microcontroller.

The computing device 100 usually includes a plurality of computer storage media. Such media can be any attainable media accessible by the computing device 100, including but not limited to volatile and non-volatile media, removable and non-removable media. The memory 120 can be a volatile memory (e.g., register, cache, Random Access Memory (RAM)), a non-volatile memory (such as, Read-Only Memory (ROM), Electrically Erasable Programmable Read-Only Memory (EEPROM), flash), or any combinations thereof. The memory 120 can include a conversion module 122 configured to execute functions of various implementations described herein. The conversion module 122 can be accessed and operated by the processing unit 110 to perform corresponding functions.

The storage device 130 can be removable or non-removable medium, and can include machine readable medium, which can be used for storing information and/or data and can be accessed within the computing device 100. The computing device 100 can further include a further removable/non-removable, volatile/non-volatile storage medium. Although not shown in FIG. 1, there can be provided a disk drive for reading from or writing into a removable and non-volatile disk and an optical disk drive for reading from or writing into a removable and non-volatile optical disk. In such cases, each drive can be connected via one or more data medium interfaces to the bus (not shown).

The communication unit 140 implements communication with another computing device through communication media. Additionally, functions of components of the computing device 100 can be realized by a single computing cluster or a plurality of computing machines, and these computing machines can communicate through communication connections. Therefore, the computing device 100 can be operated in a networked environment using a logic connection to one or more other servers, a Personal Computer (PC) or a further general network node.

The input device 150 can be one or more various input devices, such as mouse, keyboard, trackball, voice-input device and the like. The output device 160 can be one or more output devices, e.g., display, loudspeaker and printer etc. The computing device 100 also can communicate through the communication unit 140 with one or more external devices (not shown) as required, wherein the external device, e.g., storage device, display device etc., communicates with one or more devices that enable the users to interact with the computing device 100, or with any devices (such as network card, modem and the like) that enable the computing device 100 to communicate with one or more other computing devices. Such communication can be executed via Input/Output (I/O) interface (not shown).

In some implementations, apart from being integrated on an individual device, some or all of the respective components of the computing device 100 also can be set in the form of cloud computing architecture. In the cloud computing architecture, these components can be remotely arranged and can cooperate to implement the functions described by the present disclosure. In some implementations, the cloud computing provides computation, software, data access and storage services without informing a terminal user of physical positions or configurations of systems or hardware providing such services. In various implementations, the cloud computing provides services via Wide Area Network (such as Internet) using a suitable protocol. For example, the cloud computing provider provides, via the Wide Area Network, the applications, which can be accessed through a web browser or any other computing components. Software or components of the cloud computing architecture and corresponding data can be stored on a server at a remote position. The computing resources in the cloud computing environment can be merged or spread at a remote datacenter. The cloud computing infrastructure can provide, via a shared datacenter, the services even though they are shown as a single access point for the user. Therefore, components and functions described herein can be provided using the cloud computing architecture from a service provider at a remote position. Alternatively, components and functions also can be provided from a conventional server, or they can be mounted on a client device directly or in other ways.

The computing device 100 can perform portrait editing and synthesis in accordance with various implementations of the present disclosure. As shown in FIG. 1, the computing device 100 can receive, via the input device 150, a first image 170 about a head of a user and a command 180 of editing the first image 170. The editing command 180 may indicate changing a head feature of the user, such as a head pose and/or a facial expressions etc. For example, the editing command 180 in FIG. 1 may indicate simultaneously rotating the user's head leftward and downward by a given angle. The computing device 100 may generate, based on the first image 170, a 3D head model representing the head of the user. The computing device 100 may transform the 3D head model based on the received editing command 180 to reflect the changed head feature of the user. The computing device 100 may generate a second image 190 based on the transformed 3D head model. As shown in FIG. 1, the second image 190 may reflect the changed head feature of the user. That is, the head of the user is rotated leftward and downward simultaneously by a given angle.

The inventor has recognized that it is required to select a 3D head model suitable for neural network learning and manipulation to implement portrait editing and synthesis. In the implementations of the present disclosure, the 3D head model representing the head of the user may include two components: a 3D Morphable Model (3DMM) and a depth map for other head regions including hair, ear and forehead not covered by the face 3DMM. The 3DMM represents various face features with a series of parameters, which facilitates processing of the face shape and the facial expression, while the depth map can provide a convenient and powerful representation to the convolutional neural network, so as to model the complex hair shapes for example. Therefore, the compelling head manipulation effects can be achieved with such a 3D head model represented by a 3DMM and a depth map in combination.

The inventor has also recognized that two possible challenges need to be addressed when learning the 3D head model via convolutional neural networks. The first challenge is the difficulty in finding 2D face images having real 3D geometric representations as training data. Therefore, the neural network for reconstructing the head 3D representation usually cannot be trained in a supervised learning manner. In the implementations of the present disclosure, an unsupervised learning manner is adopted to train a neural network for deriving the face 3DMM. Specifically, the convolutional neural network is trained by minimizing the difference between an image rendered with the 3DMM parameters and the original image, thereby enabling three-dimensional face reconstruction for a single image. For other head regions like hair, ear and forehead, a depth estimator (also known as "depth network" or "depth estimation network") is trained using pairs of face images extracted from videos. The second challenge is how to ensure consistency of the 3D head model, since it consists of two independent components. In the implementations of the present disclosure, the neural network for reconstructing a 3D face representation is trained at first. Then, using the face depth derived from the 3D face representation as a conditional input of the depth estimation network, the depth estimation network is trained by minimizing a loss function that penalizes depth discrepancy. In this way, implementations of the present disclosure can guarantee consistency of the 3D head geometry.

The inventor has further recognized that a synthesized image obtained by transforming the 3D head model and then re-projecting the transformed 3D head model onto a 2D plane may have artifacts due to changes in head pose and/or facial expression or the re-projection. As used herein, an "Artifact" refers to an unfilled region between the head region and background and/or different head regions in the image. In the implementations of the present disclosure, the artifacts can be eliminated using a trained refinement network. Specifically, using unpaired data (such as, synthesized images having artifacts derived from re-projection) and paired data (e.g., a real portrait and a synthesized image derived from removing image contents along portrait segmentation boundary of the real portrait) as the training data, the refinement network can be trained in an adversarial learning manner, so as to regenerate a whole synthesized image. In this way, implementations of the present disclosure can effectively eliminate artifacts in the synthesized image.

Figure 2:
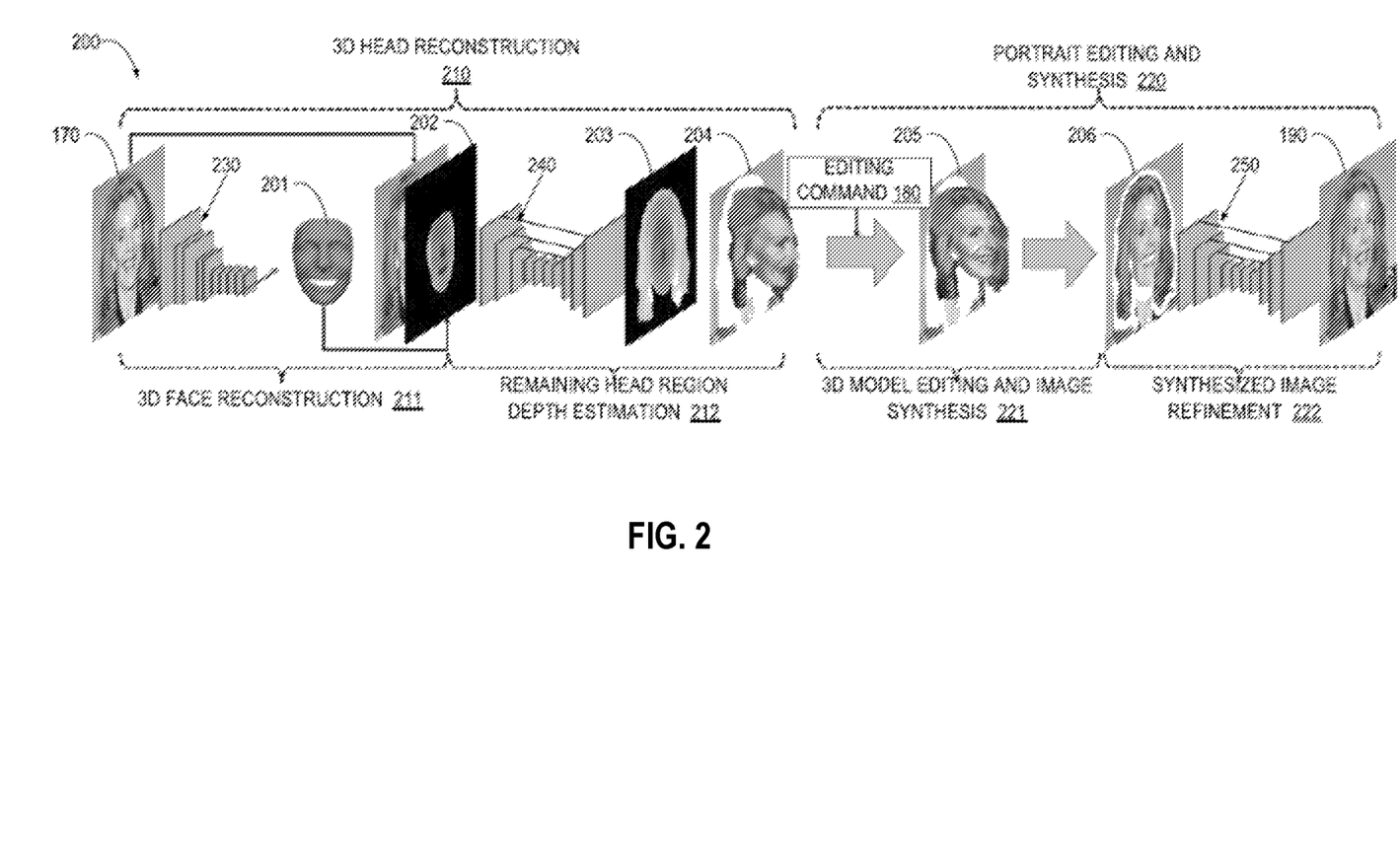
FIG. 2 illustrates a system architecture diagram for portrait editing and synthesis in accordance with implementations of the present disclosure.

FIG. 2 illustrates an architecture diagram of a system 200 for portrait editing and synthesis in accordance with implementations of the present disclosure. The system 200 can be implemented in the computing device 100 of FIG. 1. As shown in FIG. 2, the system 200 may include a 3D head reconstructing module 210 and a portrait editing and synthesis module 220. The 3D head reconstructing module 210, for example, may include a 3D face reconstructing unit 211 and a remaining head region depth estimating unit 212. The portrait editing and synthesis module 220, for example, may include a 3D model editing and image synthesis unit 221 and a synthesized image refinement unit 222. It should be understood that structure and functions of the system 200 are described only for the purpose of illustration, without suggesting any limitation to the scope of the subject matter described herein. The subject matter described herein can be embodied in different structures and/or functions.

In some implementations, the system 200 may also include an image preprocessing module (not shown in FIG. 2) for executing preprocessing operations on a face image to be processed. In some implementations, the executed preprocessing operations may include roughly aligning the images to centralize the face region and/or correspondingly scale the image. Additionally, in some implementations, the executed preprocessing operations may also include segmenting the image to determine a head region (thereafter denoted as S) therein. In some implementations, the image preprocessing module may segment the image using a trained neural network (hereinafter referred to as "first neural network"). It should be appreciated that the first neural network can be trained using any approach currently known or to be developed in the future, which will not be described in detail herein.

In some implementations, the 3D head reconstructing module 210 is configured to generate, based on the first image 170 (e.g., the preprocessed image), a 3D head model 204 representing the head of the user. As described above, in the implementations of the present disclosure, the 3D head model may include a 3DMM-based face mesh and a depth map for a remaining head region uncovered by the face 3DMM. In some implementations, for example, the 3D face reconstructing unit 211 is configured to reconstruct, based on the first image 170, a 3D face model 201 representing the face of the user, i.e., the 3DMM-based face mesh. The remaining head region depth estimating unit 212 is configured to generate a depth map 203 for the remaining head region uncovered by the 3D face model 201 in the head region. Then, the 3D face model 201 can be combined with the depth map 203 into a 3D head model 204.

In some implementations, the 3D face reconstructing unit 211 may generate, based on the first image 170, a face 3DMM as the 3D face model 201 using a trained neural network 230 (hereinafter referred to as "second neural network") as shown in FIG. 2. In the following text, a head pose is determined by a rotation vector R∈SO(3) (where SO(3) represents a 3D rotation group) and a translation vector t∈R³ (R³ indicates a 3D Euclidean space). Therefore, the head pose can be represented by a six-dimensional vector P∈R⁶.

In some implementations, with the 3DMM, the face shape F and face texture T can be denoted as:

$$F = F(\alpha, \beta) = \overline{F} + B_{id}\alpha + B_{exp}\beta \quad (1)$$
$$T = T(\delta) = \overline{T} + B_t\delta$$

where $\overline{F}$ and $\overline{T}$ respectively represent an average face shape and an average face texture; $B_{id}$, $B_{exp}$ and $B_t$ respectively represent feature sets associated with user identity (face shape), facial expression and face texture (also known as bases of Principle Component Analysis (PCA)); α, β and δ represent corresponding coefficient vectors for generating the 3D face representation, where α is a set of coefficients associated with the face shape, β is a set of coefficients associated with the facial expression and δ is a set of coefficients associated with the face texture. $\overline{F}$, $\overline{T}$, $B_{id}$, $B_{exp}$ and $B_t$ can be determined by any model or approach currently known or to be developed in the future. Therefore, it is expected to derive coefficient vectors α, β and δ in order to derive the 3DMM corresponding to the first image 170.

As described above, it is usually difficult to find 2D portraits having real 3D geometric representations as the training data. In some implementations, the neural network 230 is trained in a non-supervised learning manner using the training data set containing large volumes of face images. The core idea of training the neural network 230 is to use a differentiable renderer which renders a face image with a series of coefficient vectors estimated for a training image. The loss function can be established based on the discrepancy between the training image and the rendered face image, and the series of coefficient vectors corresponding to the training image can be obtained by minimizing the loss function. Specifically, assuming that the series of coefficients estimated for the training image are represented as a vector (α, β, δ, p, γ), where α∈ℝ⁸⁰, β∈ℝ⁶⁴, δ∈ℝ⁸⁰, p∈ℝ⁶ and γ∈ℝ⁹ and γ indicates a coefficient vector for scene illumination. It should be understood that the dimensions of the above coefficient vectors are merely exemplary, without suggesting any limitation to the scope of the present disclosure.

In some implementations, it is assumed that I represents a training image and I' represents an image rendered using a series of parameters estimated for the training image I, then the loss function can be represented as:

$$l_{photo} = \int_{\mathcal{F}} \|I - I'(\alpha, \beta, \delta, \gamma, p)\|_1 \quad (2)$$

where $\mathcal{F}$ represents the rendered face region and $\|\cdot\|_1$ indicates the $\ell_1$ norm for residuals on Red (R), Green (G) and Blue (B) color channels.

Additionally or alternatively, in some implementations, some points on the training image can be selected as landmarks to guide the training of the neural network 230. For example, assuming L represents landmarks on the training image and L' represents landmarks re-projected by their corresponding 3D vertices on the 3DMM, the scale of the predicting coefficients of the 3DMM can be regularized by minimizing the following loss function:

$$l_{landmark} = \|L - L'(\alpha, \beta, p)\|_1 \quad (3)$$

In this way, the neural network 230 can be trained based on the training data to generate a 3D face model 201 corresponding to the first image 170.

In some implementations, as shown in FIG. 2, the face region 202 covered by the 3D face model 201 in the first image 170 may be determined based on the 3D face model 201. Accordingly, the remaining head region uncovered by the 3D face model 201 in the first image 170 may be further determined. In some implementations, the remaining head region depth estimating unit 212 may generate, based on the first image 170 and the 3D face model 201, a depth map 203 corresponding to the remaining head region.

As described above, it is assumed that the head region is represented as S and the face region is represented as $\mathcal{F}$, then the remaining head region can be represented as $\mathcal{H} = \mathcal{S} - (\mathcal{S} \cap \mathcal{F})$. For example, the remaining head region $\mathcal{H}$ may include a hair region, an ear region and other face regions (e.g., a forehead region etc.) uncovered by the 3D face model 201. Due to lack of ground-truth depth data corresponding to the image as the training data, in some implementations, the neural network 240 (also referred to as "third neural network") can be trained based on a collection of image pairs in a stereo matching step for generating a depth map 203 for the remaining head region $\mathcal{H}$. It should be appreciated that image pairs are used only for training the neural network 240. The neural network 240 in actual use can run on a single image.

Assuming that $I_1$ and $I_2$ represent a pair of training images (e.g., two consecutive frames in a video about a target object) about a same target object (such as, a person) having different head poses, head poses corresponding to the images $I_1$ and $I_2$ can be respectively represented as $(R_1, t_1)$ (e.g., representing a head pose $R_1$ at a time $t_1$) and $(R_2, t_2)$ (e.g., representing a head pose $R_2$ at a time $t_1$). The head poses $(R_1, t_1)$ and $(R_2, t_2)$ can be determined using the previously trained neural network 230. Therefore, it is expected to train a single neural network to respectively predict depth maps $d_1$ and $d_2$ for the images $I_1$ and $I_2$.

In some implementations, before training, naive triangulation may be performed on regular pixel grids of $\mathcal{H}_1$ and $\mathcal{H}_2$ to build two 2D meshes, where $\mathcal{H}_1$ represents the remaining head region of the image $I_1$ and $\mathcal{H}_2$ represents the remaining head region of the image $I_2$. Given the depth map estimate $d_1$ of the image $I_1$, a 3D mesh H may be constructed via inverse-projection, such that the 3D mesh H can be transformed, via $(R_2 R_1^{-1}, -R_2 R_1^{-1} + t_2)$, into a camera system of the image $I_2$ and the transformed 3D mesh may be projected onto an image plane to obtain a synthesized image $I_2'$. A similar procedure can be executed for generating $I_1'$ from the image $I_2$ and its depth map estimate $d_2$.

In some implementations, similar to the stereo matching, color constancy between the original image and the synthesized image generated based on the depth map estimate can be maintained by minimizing the following brightness error:

$$l_{color} = \int_{\mathcal{H}'_2} \|I'_2(d_1) - I_2\|_1 + \int_{\mathcal{H}'_1} \|I'_1(d_2) - I_1\|_1 \quad (4)$$

where $\mathcal{H}_2' = \mathcal{H}_2'(\mathcal{H}_1, d_1)$ is the warped region computed from $\mathcal{H}_1$ according to the head poses and the depth map $d_1$ in the transformation process described above. Similarly, $\mathcal{H}_1' = \mathcal{H}_1'(\mathcal{H}_2, d_2)$ is the warped region computed from $\mathcal{H}_2$ according to the head poses and the depth map $d_2$ in the transformation process as described above.

Additionally or alternatively, in some implementations, besides the above brightness error loss function, the following gradient discrepancy loss function also can be applied:

$$l_{color} = \int_{\mathcal{H}'_2} \|I'_2(d_1) - I_2\|_1 + \int_{\mathcal{H}'_1} \|I'_1(d_2) - I_1\|_1 \quad (5)$$

where ∇ denotes the gradient operator and the gradient discrepancy is usually more robust than the brightness change.

Additionally or alternatively, in some implementations, a second-order smoothness loss function shown as below also can be minimized to impose a spatial smoothness constraint:

$$l_{smooth} = \int_{\mathcal{H}_1} |\Delta d_1| + \int_{\mathcal{H}_2} |\Delta d_2| \quad (6)$$

where Δ denotes the Laplace operator.

Additionally, in some implementations, consistency between $d_1$ and $d_2$ can be remained by minimizing the following loss function:

$$l_{consist} = \int_{\mathcal{H}'_2} |d'_2(d_1) - d_2| + \int_{\mathcal{H}'_1} |d'_1(d_2) - d_1| \quad (7)$$

where $d_2'$ and $d_1'$ are the transformed depth maps from depth maps $d_1$ and $d_2$, respectively.

In some implementations, to improve robustness for images having occlusion and inaccurate segmentation, per-pixel weights may be applied to the above loss functions (4)-(7), where the pixel weights can be generated from the image segmentation network (i.e., the first neural network) as described above. For example, the first neural network may generate, based on the images $I_1$ and $I_2$, segmentation probability maps $p_1$ and $p_2$ indicating the above weights respectively. By applying the per-pixel weights, the color discrepancy loss function shown in the above formula (1) can be transformed into $\int_{\mathcal{H}'_2} p_2' \cdot \|I_2'(d_1) - I_2\|_1 + \int_{\mathcal{H}'_1} p_1' \cdot \|I_1'(d_2) - I_1\|_1$, where $p_2'$ and $p_1'$ are probability maps warped from $p_1$ and $p_2$ respectively. Other loss functions can be derived in a similar manner and will not be repeated here.

In some implementations, to ensure consistency of the head 3D geometry, instead of directly estimating the depth of the remaining head region from the input image (i.e., the first image 170), the reconstructed face shape F (i.e., face 3DMM) may be projected onto the image plane in the first place to obtain a depth map $d^f$ corresponding to the face region. Then, the depth map $d^f$, together with the input image, can act as the input of the third neural network 240. The depth map $d^f$ can provide beneficial information (such as, a head pose, a camera distance and so on) for hair and ear depth estimation. In addition, with the depth map $d^f$ acting as the conditional input of the depth network, the known depth around the face contour can be easily propagated to the adjacent regions with unknown depth.

Additionally, in some implementations, the neural network can be trained using the depth map $d^f$ as the target to predict the depth of the face region, where the utilized loss function is shown as below:

$$l_{face} = \int_{S_1 \cap \mathcal{F}_1} |d_1 - d_1^f| + \int_{S_2 \cap \mathcal{F}_2} |d_2 - d_2^f| \quad (8)$$

where $\mathcal{S}_1$ and $\mathcal{S}_2$ respectively represent head regions of the images $I_1$ and $I_2$; $\mathcal{F}_1$ and $\mathcal{F}_2$ respectively represent face regions of the images $I_1$ and $I_2$; and $d_1^f$ and $d_2^f$ respectively represent depths maps of the face regions of the images $I_1$ and $I_2$. Accordingly, a consistency constraint between the reconstructed 3D face representation and the estimated 3D geometry in other regions can be imposed by using, for example, the following head smoothness loss function:

$$l_{smooth} = \int_{S_1} |\Delta d_1| + \int_{S_2} |\Delta d_2| \quad (9)$$

where Δ denotes the Laplace operator.

Although the consistency of the head geometry is greatly improved by using the face depth from the 3D face model, the exact matching between the face mesh and the remaining head region mesh still cannot be guaranteed. Therefore, in some implementations, the 3D face model may be slightly deformed to obtain exact matching. For example, the inner face region of the 3D face model can be kept unchanged and the boundary regions of the face may be gradually deformed, such that the projected depth values match those predicted by the depth network, thereby ensuring consistency of the finally generated 3D head model.

Figure 3:
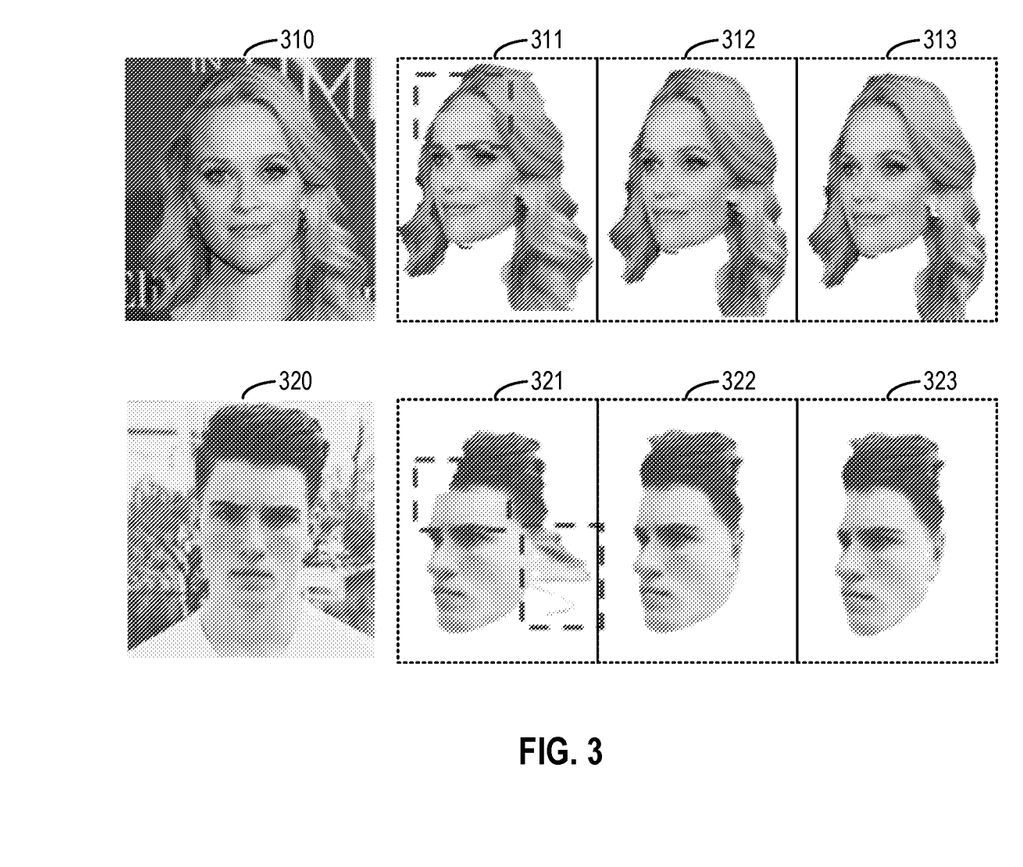
FIG. 3 illustrates effect diagrams of three-dimensional head reconstruction in accordance with implementations of the present disclosure.

FIG. 3 illustrates effect diagrams of 3D head reconstruction with or without using the face depth as the input of the depth estimation network. As shown in FIG. 3, regarding the input image 310, without using the face depth as the input of the depth estimation network, the projection of the generated 3D head model is shown as an image 311. It can be seen that there is a significant geometric inconsistency in the area indicated by the dashed box in the image 311. When the face depth serves as the input of the depth estimation network, the projection of the generated 3D head model is shown as an image 312. Compared with the image 311, the head geometry consistency in the image 312 has been greatly improved. When the 3D face model is slightly deformed, the projection of the generated 3D head model is shown as an image 313. Compared with the image 312, the head geometry consistency in the image 313 has been further improved. As a further example, regarding the input image 320, without using the face depth as the input of the depth estimation network, the projection of the generated 3D head model is shown as an image 321. It can be seen that there is a significant geometric inconsistency in the area indicated by the dashed box in the image 321. When the face depth serves as the input of the depth estimation network, the projection of the generated 3D head model is shown as an image 322. Compared with the image 321, the head geometry consistency in the image 322 has been greatly improved. When the 3D face model is slight deformed, the projection of the generated 3D head model is shown as an image 323. Compared with the image 322, the head geometry consistency in the image 323 has been further improved.

Working principles of the 3D head reconstructing model 210 and the training procedure of the neural networks 230 and 240 therein have been specifically described above. In the following, working principles of the portrait editing and synthesis module 220 and the training procedure of the neural network 250 therein will be further described in detail.

In some implementations, the portrait editing and synthesis module 220 may be configured to generate, based on the received editing command 180 for changing a head feature of the user and the 3D head model 204, a second image 190 reflecting the changed head feature of the user. As shown in FIG. 2, the portrait editing and synthesis module 220 may include a 3D model editing and image synthesis unit 221 and a synthesized image refinement unit 222. In some implementations, the 3D model editing and image synthesis unit 221 may be configured to transform the 3D head model 204 based on the received editing command 180, to generate a 3D head model 205 reflecting the changed head feature of the user. The 3D model editing and image synthesis unit 221 may also be configured to project the 3D head model 205 onto a 2D plane to generate a synthesized image 206. In some implementations, the synthesized image refinement unit 222 may be configured to further refine the synthesized image 206 to derive the refined image 190.

In some implementations, the editing command 180 may indicate changing a head pose and/or a facial expression of the user. For changing the head pose, the editing command 180, for example, may indicate a target head pose $\overline{P}$ or an offset $\delta p$ of the target head pose relative to the current head pose. Regarding the facial expression, the editing command 180, for example, may indicate a vector representing a target facial expression. The target head pose and/or the target facial expression may be pre-defined or obtained from a further image reflecting the target head pose and/or the target facial expression (e.g., shown in FIG. 5 as below).

In some implementations, in order to change the head pose, the 3D model editing and image synthesis unit 221 may perform a rigid transformation on the 3D head model 204 based on the target head pose $\overline{P}$ or the head pose offset $\delta P$ indicated in the editing command 180. In order to change the facial expression, the 3D model editing and image synthesis unit 221 may apply the expression changes by controlling the coefficient $\beta$ in the 3DMM based on the expression vector indicated in the editing command 180. After changing the head pose and/or the facial expression, the 3D model editing and image synthesis unit 221 may re-project the transformed 3D head model 205 onto the image plane to derive the synthesized image 206.

In some cases, due to the changes of the head features (e.g., head pose and/or facial expression) of the user, the synthesized image 206 may have artifacts, such as missing background and/or head region. Besides, the re-projection procedure may possibly cause artifacts in the synthesized image 206 because of imperfect rendering. In some implementations, the synthesized image refinement unit 222 may be configured to determine whether artifacts exist in the synthesized image 206 and eliminate the artifacts using a trained neural network 250 (also referred to as "fourth neural network") in response to determining presence of the artifacts in the synthesized image 206.

In some implementations, the fourth neural network 250 may be trained using the paired data (e.g., a real portrait and a synthesized image masked out image contents along portrait segmentation boundary of the real portrait) and unpaired data (such as, the re-projected synthesized image 206). In order to acquire the paired data, several real images having different head poses can be obtained and the synthesized images corresponding to the real portraits can be obtained by removing regions around the portrait segmentation boundary (e.g., the boundary between the head region and the background and/or the boundary between different head regions) in the images. Assuming that J represents unpaired data (such as, the re-projected synthesized image 206) and (R, $\hat{R}$) represents paired data, where R represents the synthesized image masked out the portrait segmentation boundary and $\hat{R}$ represents a real image corresponding thereto. The fourth neural network 250 can be trained by minimizing the following color loss function:

$$l_{color}(G) = \mathbb{E}_J\left[\int_B \|G(J) - J\|_1\right] + \mathbb{E}_R\left[\int \|G(R) - \hat{R}\|_1\right] \quad (10)$$

where G represents the fourth neural network 250; $\mathcal{B}$ represents the background and warped head regions of J. In some implementations, the adversarial learning can be applied to enhance the efficiency of the neural network training. Specifically, a discriminator network D whose goal is to distinguish the output of the network G from the real images can be introduced into the fourth neural network to be trained. The network G can be trained to disable the network D from distinguishing the output of the network G from the real images. In some implementations, for example, the loss function for training the network G may be shown as below:

$$l_{adv}(G) = \frac{1}{2}\mathbb{E}_J[(D(G(J), J) - 1)^2] + \frac{1}{2}\mathbb{E}_R[(D(G(R), R) - 1)^2] \quad (11)$$

Besides, the loss function for training the network D may be:

$$l_{adv}(D) = \frac{1}{2}\mathbb{E}_J[(D(G(J), J) - 0)^2] + \quad (12)$$
$$\frac{1}{2}\mathbb{E}_R(D(G(R), R) - 0)^2 + \mathbb{E}_R(D(\hat{R}, R) - 1)^2$$

It should be appreciated that the network D may take both of the output (or real images) and the input of the network G as its input.

Figure 4:
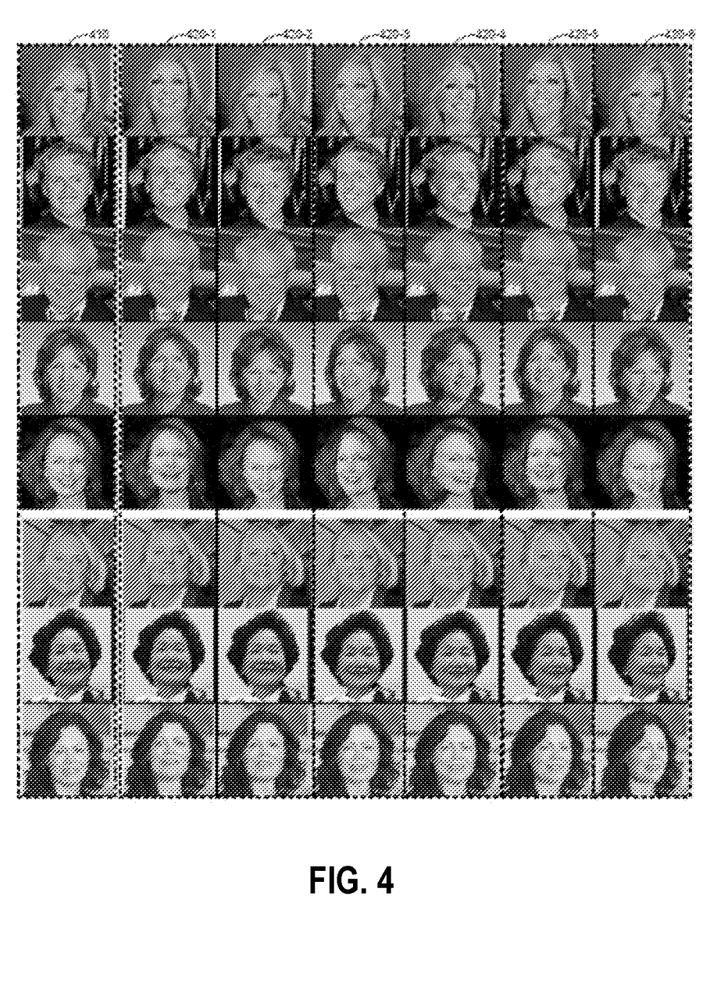
FIG. 4 illustrates effect diagrams of portrait editing and synthesis in accordance with implementations of the present disclosure.

FIG. 4 illustrates effect diagrams of portrait editing and synthesis in accordance with implementations of the present disclosure. FIG. 4 illustrates a group of input images 410 and a plurality of groups of output images 420-1, 420-2 . . . 420-6, where each group of output images 420-N (1≤N≤6) correspond to a head pose. The output images 420-4, 420-5 and 420-6 demonstrate the effects of performing continuous editing on the head pose of the input image 410. It can be seen that the implementations of the present disclosure can achieve smooth and consistent head manipulation.

Figure 5:
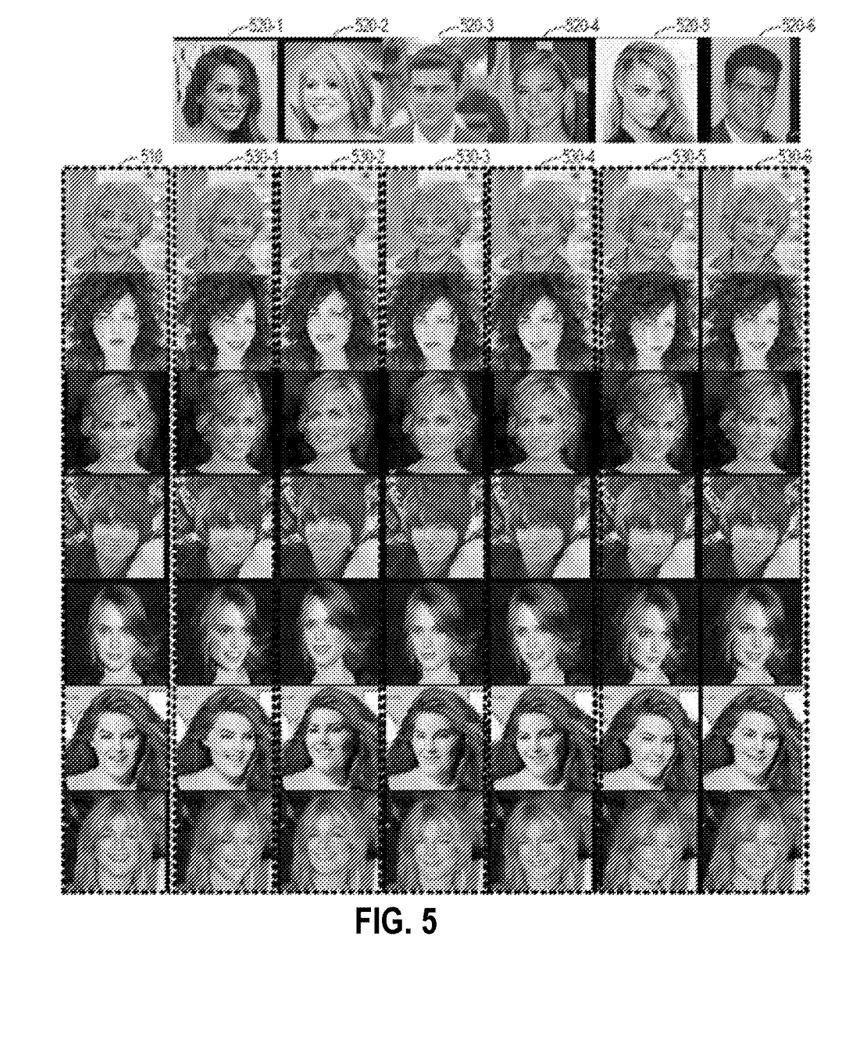
FIG. 5 illustrates effect diagrams of portrait editing and synthesis in accordance with implementations of the present disclosure.

FIG. 5 effect diagrams of portrait editing and synthesis in accordance with implementations of the present disclosure.

FIG. 5 illustrates a group of input images 510, a group of reference images 520-1, 520-2 . . . 520-6 and a plurality of groups of output images 530-1, 530-2 . . . 530-6. Each group of output images 530-N (1≤N≤6) correspond to a head pose and a facial expression, both of which can be obtained from the corresponding reference image 520-N. That is, the implementations of the present disclosure can generate the corresponding synthesized image 530-N by transferring the head pose and/or the facial expression reflected by the reference image 520-N to the input image 510.

Figure 6:
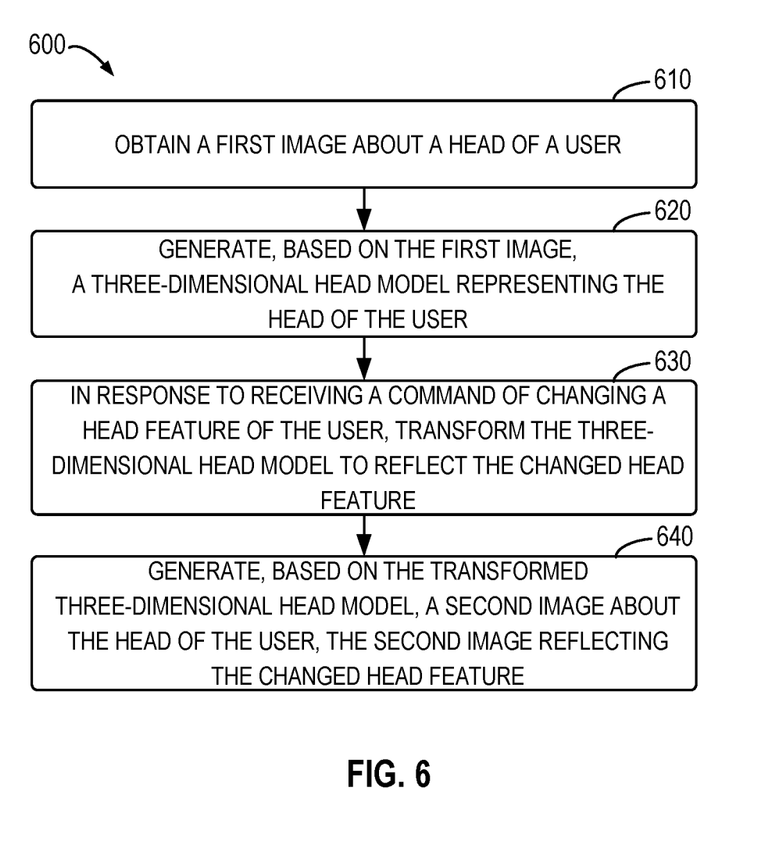
FIG. 6 illustrates a flowchart of a method for portrait editing and synthesis in accordance with implementations of the present disclosure.

FIG. 6 illustrates a flowchart of a method 600 for portrait editing and synthesis in accordance with some implementations of the present disclosure. The method 600 can be implemented by the computing device 100, for example, can be implemented at an image processing module 122 in the memory 120 of the computing device 100.

As shown in FIG. 6, at block 610, the computing device 100 obtains a first image about a head of a user. At block 620, the computing device 100 generates, based on the first image, a three-dimensional head model representing the head of the user. At block 630, the computing device 100, in response to receiving a command of changing a head feature of the user, transforms the three-dimensional head model to reflect the changed head feature. At block 640, the computing device generates, based on the transformed three-dimensional head model, a second image about the head of the user, the second image reflecting the changed head feature.

In some implementations, generating the three-dimensional head model comprises: determining a head region corresponding to the head of the user in the first image; and generating the three-dimensional head model based on the first image and the head region.

In some implementations, determining the head region comprises: determining the head region by segmenting the first image using a trained first neural network.

In some implementations, generating the three-dimensional head model based on the first image and the head region comprises: generating, based on the first image, a three-dimensional face model representing a face of the user; determining, from the head region, a face region covered by the three-dimensional face model and a remaining head region uncovered by the three-dimensional face model; generating, based on the first image and the three-dimensional face model, a first depth map corresponding to the remaining head region; and generating, based on the three-dimensional face model and the first depth map, the three-dimensional head model.

In some implementations, generating the three-dimensional face model comprises: generating, based on the first image and using a second neural network trained in an unsupervised learning manner, a three-dimensional deformation model representing the face as the three-dimensional face model.

In some implementations, the three-dimensional face model indicates at least one of the following: a face shape, a facial expression, a face texture, a head pose and a face illumination.

In some implementations, the remaining head region includes at least one of the following: a hair region, an ear region and other face regions uncovered by the three-dimensional face model.

In some implementations, generating the first depth map comprises: generating, based on the three-dimensional face model, a second depth map corresponding to the face region; and generating, using a third neural network trained in an unsupervised learning manner, the first depth map based on the first image and the second depth map.

In some implementations, the command indicates changing at least one of following head features of the user: a head pose and a facial expression.

In some implementations, generating the second image comprises: generating the second image by projecting the transformed three-dimensional head model onto a two-dimensional plane.

In some implementations, the method further comprises: determining whether an artifact is present in the second image; and in response to determining that the artifact is present in the second image, eliminating the artifact using a trained fourth neural network.

In view of the above, the portrait editing and synthesis solution in accordance with implementations of the present disclosure can realize editing of features like a head pose and/or a facial expression based on a single portrait image without manual intervention and automatically synthesize a corresponding image. Besides, the solution can eliminate artifacts in the synthesized image and achieve a smooth and consistent synthesis effect.

Some example implementations of the present disclosure are listed below.

In one aspect, the present disclosure provides a computer-implemented method. The method comprises: obtaining a first image about a head of a user; generating, based on the first image, a three-dimensional head model representing the head of the user; in response to receiving a command of changing a head feature of the user, transforming the three-dimensional head model to reflect the changed head feature; and generating, based on the transformed three-dimensional head model, a second image about the head of the user, the second image reflecting the changed head feature.

In some implementations, generating the three-dimensional head model comprises: determining a head region corresponding to the head of the user in the first image; and generating the three-dimensional head model based on the first image and the head region.

In some implementations, determining the head region comprises: determining the head region by segmenting the first image using a trained first neural network.

In some implementations, generating the three-dimensional head model based on the first image and the head region comprises: generating, based on the first image, a three-dimensional face model representing a face of the user; determining, from the head region, a face region covered by the three-dimensional face model and a remaining head region uncovered by the three-dimensional face model; generating, based on the first image and the three-dimensional face model, a first depth map corresponding to the remaining head region; and generating, based on the three-dimensional face model and the first depth map, the three-dimensional head model.

In some implementations, generating the three-dimensional face model comprises: generating, based on the first image and using a second neural network trained in an unsupervised learning manner, a three-dimensional deformation model representing the face as the three-dimensional face model.

In some implementations, the three-dimensional face model indicates at least one of the following: a face shape, a facial expression, a face texture, a head pose and a face illumination.

In some implementations, the remaining head region includes at least one of the following: a hair region, an ear region and other face regions uncovered by the three-dimensional face model.

In some implementations, generating the first depth map comprises: generating, based on the three-dimensional face model, a second depth map corresponding to the face region; and generating, using a third neural network trained in an unsupervised learning manner, the first depth map based on the first image and the second depth map.

In some implementations, the command indicates changing at least one of following head features of the user: a head pose and a facial expression.

In some implementations, generating the second image comprises: generating the second image by projecting the transformed three-dimensional head model onto a two-dimensional plane.

In some implementations, the method further comprises: determining whether an artifact is present in the second image; and in response to determining that the artifact is present in the second image, eliminating the artifact using a trained fourth neural network.

In another aspect, the present disclosure provides an electronic device. The electronic device comprises: a processing unit; and a memory coupled to the processing unit and including instructions stored thereon, the instructions, when executed by the processing unit, causing the device to perform actions comprising: obtaining a first image about a head of a user; generating, based on the first image, a three-dimensional head model representing the head of the user; in response to receiving a command of changing a head feature of the user, transforming the three-dimensional head model to reflect the changed head feature; and generating, based on the transformed three-dimensional head model, a second image about the head of the user, the second image reflecting the changed head feature.

In some implementations, generating the three-dimensional head model comprises: determining a head region corresponding to the head of the user in the first image; and generating the three-dimensional head model based on the first image and the head region.

In some implementations, determining the head region comprises: determining the head region by segmenting the first image using a trained first neural network.

In some implementations, generating the three-dimensional head model based on the first image and the head region comprises: generating, based on the first image, a three-dimensional face model representing a face of the user; determining, from the head region, a face region covered by the three-dimensional face model and a remaining head region uncovered by the three-dimensional face model; generating, based on the first image and the three-dimensional face model, a first depth map corresponding to the remaining head region; and generating, based on the three-dimensional face model and the first depth map, the three-dimensional head model.

In some implementations, generating the three-dimensional face model comprises: generating, based on the first image and using a second neural network trained in an unsupervised learning manner, a three-dimensional deformation model representing the face as the three-dimensional face model.

In some implementations, the three-dimensional face model indicates at least one of the following: a face shape, a facial expression, a face texture, a head pose and a face illumination.

In some implementations, the remaining head region includes at least one of the following: a hair region, an ear region and other face regions uncovered by the three-dimensional face model.

In some implementations, generating the first depth map comprises: generating, based on the three-dimensional face model, a second depth map corresponding to the face region; and generating, using a third neural network trained in an unsupervised learning manner, the first depth map based on the first image and the second depth map.

In some implementations, the command indicates changing at least one of following head features of the user: a head pose and a facial expression.

In some implementations, generating the second image comprises: generating the second image by projecting the transformed three-dimensional head model onto a two-dimensional plane.

In some implementations, the actions further comprise: determining whether an artifact is present in the second image; and in response to determining that the artifact is present in the second image, eliminating the artifact using a trained fourth neural network.

In yet another aspect, the present disclosure provides a computer program product tangibly stored in a non-transitory computer storage medium and including machine-executable instructions, the machine-executable instructions, when executed by a device, causing the device to perform the method of the above aspect.

In yet another aspect, the present disclosure provides a computer-readable medium having machine-executable instructions stored thereon, the machine-executable instructions, when executed by a device, causing the device to perform the method of the above aspect.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the shown particular order or in a sequential order, or all shown operations are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
obtaining a first image about a head of a user;
generating, based on the first image, a three-dimensional head model representing the head of the user which comprises:
determining a face region corresponding to a face of the user in the first image; and
generating, based on the first image, a three-dimensional face model representing a face of the user;
determining a head region uncovered by the three-dimensional face model;
generating, based on the first image and the three-dimensional face model, a first depth map corresponding to the head region uncovered by the three-dimensional face model, wherein generating the first depth map comprises:
generating, based on the three-dimensional face model, a second depth map corresponding to the face region; and
generating, using a third neural network trained in an unsupervised learning manner, the first depth map based on the first image and the second depth map;
generating the three-dimensional head model based on the three-dimensional face model and the first depth map;
in response to receiving a command of changing a head feature of the user, transforming the three-dimensional head model to reflect the changed head feature; and
generating, based on the transformed three-dimensional head model, a second image about the head of the user, the second image reflecting the changed head feature.

2. The method of claim 1, wherein determining the head region comprises:
determining the head region by segmenting the first image using a trained first neural network.

3. The method of claim 1, wherein generating the three-dimensional face model comprises:
generating, based on the first image and using a second neural network trained in an unsupervised learning manner, a three-dimensional deformation model representing the face as the three-dimensional face model.

4. The method of claim 1, wherein the three-dimensional face model indicates at least one of the following:
a face shape, a facial expression, a face texture, a head pose and a face illumination.

5. The method of claim 1, wherein the remaining head region includes at least one of the following:
a hair region, an ear region and other face regions uncovered by the three-dimensional face model.

6. The method of claim 1, wherein the command indicates changing at least one of following head features of the user:
a head pose and a facial expression.

7. The method of claim 1, wherein generating the second image comprises:
generating the second image by projecting the transformed three-dimensional head model onto a two-dimensional plane.

8. The method of claim 1, further comprising:
determining whether an artifact is present in the second image; and
in response to determining that the artifact is present in the second image, eliminating the artifact using a trained fourth neural network.

9. An electronic device, comprising:
a processing unit; and
a memory coupled to the processing unit and including instructions stored thereon, the instructions, when executed by the processing unit, causing the device to perform actions comprising:
obtaining a first image about a head of a user;
generating, based on the first image, a three-dimensional head model representing the head of the user which comprises:
determining a face region corresponding to a face of the user in the first image; and
generating, based on the first image, a three-dimensional face model representing a face of the user;
determining a head region uncovered by the three-dimensional face model;
generating, based on the first image and the three-dimensional face model, a first depth map corresponding to the head region uncovered by the three-dimensional face model, wherein generating the first depth map comprises:
generating, based on the three-dimensional face model, a second depth map corresponding to the face region; and
generating, using a third neural network trained in an unsupervised learning manner, the first depth map based on the first image and the second depth map;
generating the three-dimensional head model based on the three-dimensional face model and the first depth map;
in response to receiving a command of changing a head feature of the user, transforming the three-dimensional head model to reflect the changed head feature; and
generating, based on the transformed three-dimensional head model, a second image about the head of the user, the second image reflecting the changed head feature.

10. A computer program product tangibly stored in a non-transitory computer storage medium and including machine-executable instructions, the machine-executable instructions, when executed by a device, causing the device to perform actions comprising:
obtaining a first image about a head of a user;
generating, based on the first image, a three-dimensional head model representing the head of the user which comprises:

determining a face region corresponding to the face of the user in the first image; and generating, based on the first image, a three-dimensional face model representing a face of the user;

determining a head region uncovered by the three-dimensional face model;

generating, based on the first image and the three-dimensional face model, a first depth map corresponding to the head region uncovered by the three-dimensional face model, wherein generating the first depth map comprises:

generating, based on the three-dimensional face model, a second depth map corresponding to the face region; and     generating, using a third neural network trained in an unsupervised learning manner, the first depth map based on the first image and the second depth map;

generating the three-dimensional head model based on the three-dimensional face model and the first depth map;

in response to receiving a command of changing a head feature of the user, transforming the three-dimensional head model to reflect the changed head feature; and generating, based on the transformed three-dimensional head model, a second image about the head of the user, the second image reflecting the changed head feature.

* * * * *